Figure 3:
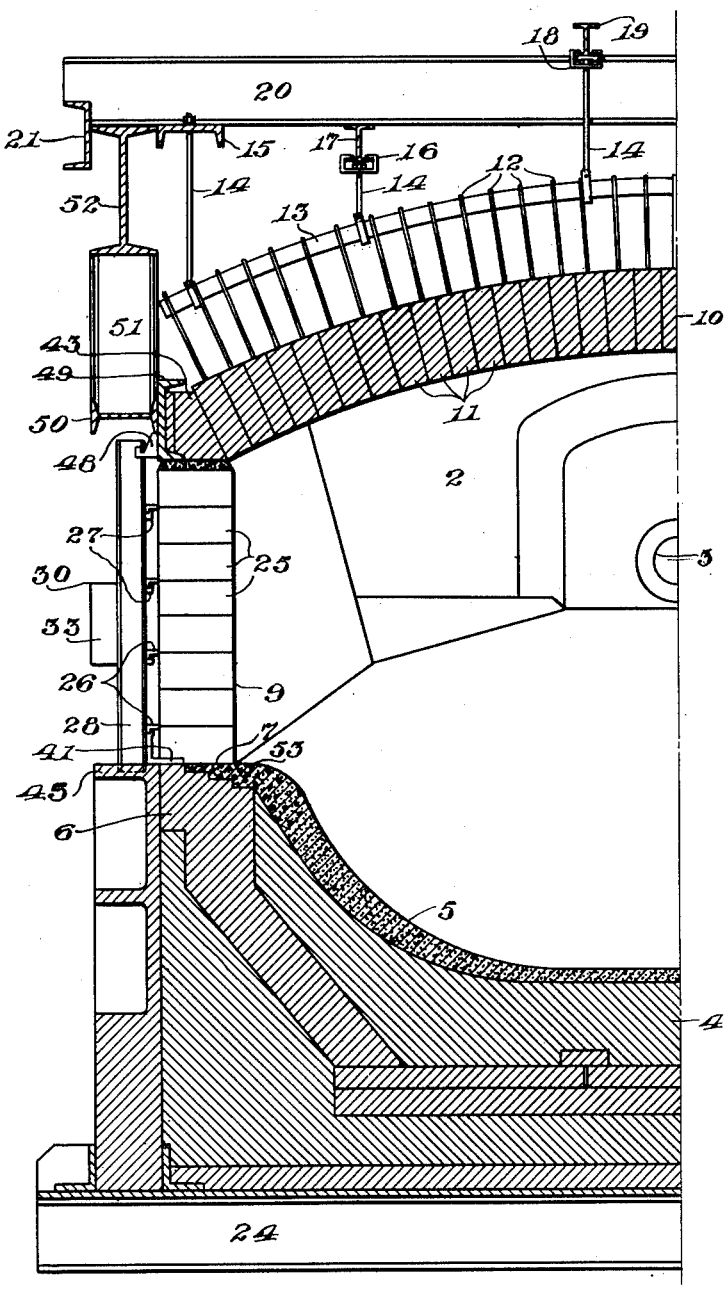

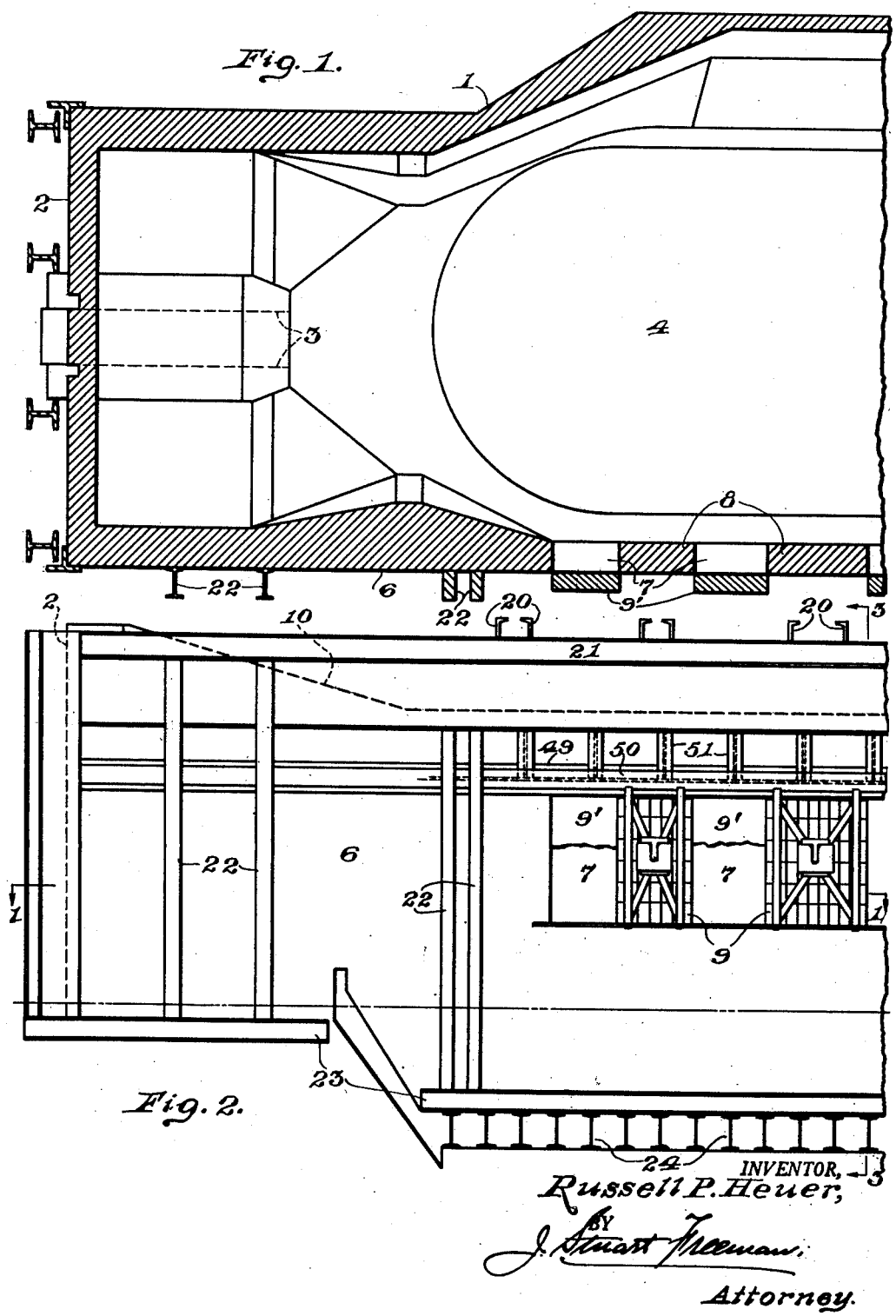

INVENTOR,
Russell P. Heuer,
BY
J. Stuart Freeman,
Attorney.

May 5, 1953 R. P. HEUER 2,637,286
SELF-CONTAINED REPLACEABLE PANELS FOR OPEN HEARTH FURNACES
Filed Nov. 12, 1947 3 Sheets-Sheet 3
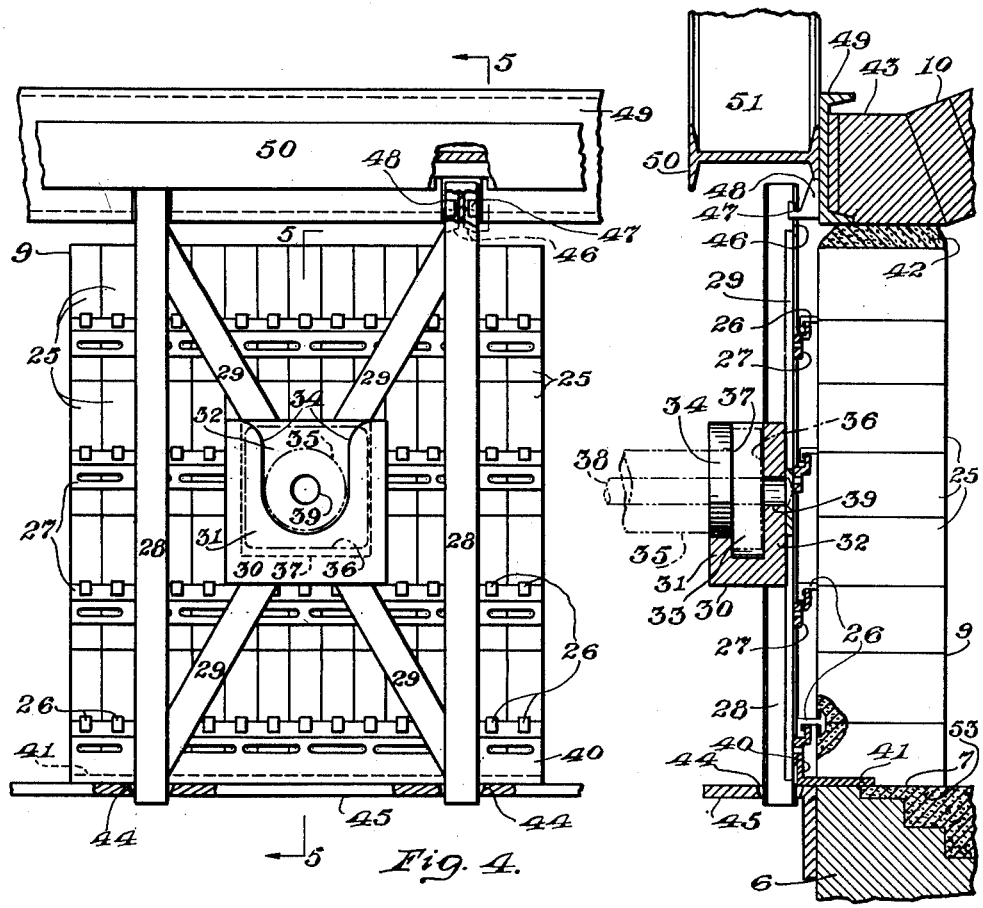
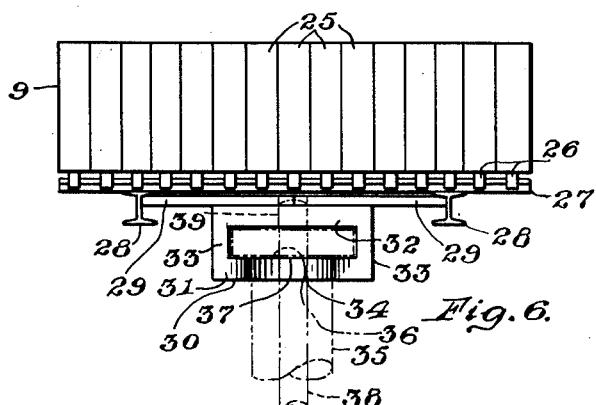
INVENTOR,
Russell P. Heuer,
BY
J. Stuart Freeman,
Attorney.

Patented May 5, 1953

2,637,286

UNITED STATES PATENT OFFICE 2,637,286

SELF-CONTAINED REPLACEABLE PANELS FOR OPEN HEARTH FURNACES

Russell Pearce Heuer, Villanova, Pa., assignor to General Refractories Company, a corporation of Pennsylvania Application November 12, 1947, Serial No. 785,445

8 Claims. (Cl. 110—172)

The object of the invention is to provide improvements in structures such as open hearth furnaces, that have heretofore comprised one or more fixed integral piers between the usual charging doors, but which according to the present invention are replaced by an equal number of readily removable panels. Such a provision of removable and replaceable panels provides for their independent removal, substitution and repair, as well as by providing for a single wide opening of the entire charging door area if desired, so that instead of relatively small quantities of scrap being placed in the furnace at spaced intervals in sequence, a relatively evenly distributed charge may be injected into the structure simultaneously. In the following description and appended claims it is to be understood that wherever reference is made to an open hearth furnace per se, such term includes and anticipates any and all structures to which the invention is adapted for use.

To illustrate the applicabiilty of the invention, reference is made to the front wall of an open hearth furnace through which there are usually from three to five or even more charging openings normally closed by well known types of vertically slidable doors, while between such openings are piers that have heretofore been considered necessary to support the upper portions of the steel frame including the skewback channel and thereby the roof, whether the latter may be of the sprung arch or suspended type. These piers are located immediately to the rear of the heretofore essential buck stays by which the superstructure of the framework is largely supported, and which simultaneously maintain in fixed position the skewback channels that are required for all arches, but which in the case of a sprung arch support the entire weight of the roof, and which in the absence of the buck stays would spread laterally and eventually drop the roof into the furnace.

Another object, therefore, is to provide an open hearth furnace frame construction which permits the elimination of all buck stays within the longitudinal limits of the door area, and instead provides for the support and transverse restraint of the roof, particularly roofs of the suspended type, by vertically and transversely rigid structural steel elements of channel, I-beam, and similar forms supported by the opposite end portions of the metal framework of the furnace.

A further object is to provide an improved self-contained type of panel between adjacent door openings, said panel principally comprising a rigid framework, a facing of refractory bricks preferably demountably and replaceably supported thereby, means to normally secure such panel in fixed position in, and as a unitary part of, the furnace wall, and connection means for engagement by the peel and lock pin of an ordinary loading mechanism, so that the panel can be lifted, inserted and then lowered into operative position with the least possible delay and labor.

Still another and more specific object is to provide a panel of the type hereinafter referred to, which comprises a preferably open framework of relatively light weight channels or I-beams, properly cross-braced and carrying upon its inner face a series of vertically spaced, longitudinally extending brackets, a plurality of horizontally adjustable hangers detachably carried by said brackets, and sufficient refractory bricks to cover the inner face of said framework, each brick being provided with a hanger-engageable surface for operatively supporting said brick upon said framework, and the bottom course of said brick being further supported by a flange integrally carried by the lowermost of said brackets.

And a still further object is to provide a self-contained panel structure, comprising or having secured thereto a recessed member of such type as characterizes the end portion of a furnace loading box, and by means of which the panel is engaged by, lifted and positioned by the peel of a loading mechanism.

With the objects thus broadly stated, the invention comprises further details of construction and operation, which are hereinafter fully brought out in the following description, when read in conjunction with the accompanying drawings, in which Fig. 1 is a horizontal section on the line 1—1 of Fig. 2 but instead of the removable panels of Fig. 2 there being shown fixed integral piers such as are commonly used in open hearth furnaces generally, and with doors of any well known type indicated for closing the charging openings; Fig. 2 is a front elevation of substantially the left end portion of an open hearth furnace comprising one embodiment of the invention and showing the removable panels that comprise the heart of the invention but without the usual doors to cover the charging openings; Fig. 3 is a vertical section of the left half of the furnace taken on the line 3—3 of Fig. 2 and therefore showing one of the removable panels in side elevation; Fig. 4 is an enlarged front or outside elevational view of one of the panels constructed in accordance with the basic principles of the invention, together with abbreviated adjacent portions of the furnace framework to which the panel is normally locked in operative position; Fig. 5 is a vertical section on the irregular line 5—5 of Fig. 4; and Fig. 6 is a plan view of said panel.

Referring to the drawings, the left hand half of an open hearth furnace is shown as comprising a back wall 1, an end wall 2 through which extends a fuel burner 3, a bottom 4 composed largely of brick topped by a surface layer 5 of such a refractory material as dead burned magnesite, a front wall 6 through which extend spaced charging openings 7 separated heretofore by fixed, integral piers 8 but in accordance with the present invention replaced by removable panels 9, and finally by a refractory roof 10, which in this instance is of the suspended type.

It is to be understood that the invention is adapted for use in furnaces having sprung arches, but for purposes of illustration the suspended type of roof is here shown. This roof comprises transversely extending courses of front-to-rear bricks 11 suspended by individual hangers 12, that are carried by tubes or bars 13 that extend transversely of said roof and are supported by variously arranged bars 14, one of which depends from a channel 15, another from a slidably adjustable hanger 16 carried by an I-beam 17, and the third by a similar hanger 18 carried by a second I-beam 19, said channel and first I-beam 17 being welded or otherwise secured to the under side of a transversely extending larger channel 20, while the second I-beam is carried by and upon the upper surface of said last-mentioned channel, thus showing some of the many ways of supporting the brick of a suspended roof.

The transverse channel 20, as well as the several others of similar size and arrangement, is carried by longitudinally extending channels 21 that are supported in turn by as many buckstays 22 as may be necessary, said buckstays resting upon the steel foundation work 23 and 24, which may be of any suitable construction and conform to any standards determined by individual requirements and set by accepted practices. Heretofore, buckstays have invariably extended substantially vertically, singly or in pairs, between pairs of adjacent charging openings and outwardly of the fixed piers 8 (Fig. 1), since it has been considered unavoidably essential that the superstructure of the framework had to be supported by said buckstays, which also performed the heretofore necessary function of transversely restraining the roof, whether of the sprung arch or suspended types though to different degrees.

The improved panel (Figs. 4, 5 and 6) is essentially a rectangular assembly of refractory bricks 25 normally positioned in place of the fixed pier which it replaces to prevent loss of appreciable heat between the removable doors that invariably close the charging openings 7. As these bricks in time disintegrate in various ways and must be renewed or replaced, they are replaceably carried by a permanent framework hereinafter described in detail. In order, therefore, to be readily replaceable they are detachably supported by hangers 26 that have an opposite hooked end portion extending over and engaging the front side of horizontally extending brackets 27, which in turn are secured, as by welding, to a pair of spaced, vertically extending I-beams 28, secured together and braced by diagonally extending tie members 29, which are welded together and may cross each other if desired at their central portions. The bricks 25 may be of silica or other refractory material suitable for use in the furnace. A preferred type of refractory is a mixture of chromite and magnesia. The brick may be prepared without kiln firing and may desirably be fitted with oxidizable metallic spacer plates as shown in Heuer U. S. Patent 2,289,911.

In order to lift the panel as a unit and to set it in place in upright position, there is secured to said framework what might be termed a lifting bracket 30, which comprises spaced front and rear walls 31 and 32, connected together at their laterally opposite edges 33, while said front wall is provided with a U-shaped cutout 34 into which is lowered the peel shank 35 of a loading mechanism, said shank having a rectangular head 36 that substantially fills the recess 37 within said bracket 30, while the usual locking pin or shaft 38 of said peel is pushed forward until it enters a central recess or aperture 39 in the rear wall of said lifting bracket. Thus, as long as the pin or shaft extends into said aperture, the peel and its head cannot be removed from within the recess in said connection, and the peel is thus able to lift and move the unit panel into operative position or to remove it therefrom.

In order to insure the positive lifting of the lowermost row or course of bricks 25 of said panel and thereby those other courses superimposed upon it, said lowermost bracket 40 extends downwardly and is provided with a horizontally projecting flange plate, or toe 41 of substantial dimensions upon which said lower course of bricks rest, as well as being secured against said frame by means of the hangers hereinbefore described. Said flange, if desired, may be independent of any of said brackets. It will also be noted that the overall height of the assembly of bricks is less than the height of the opening into which said panel is operatively positioned (Fig. 5), and that granular or plastic refractory material 42 may be inserted between the uppermost course of panel bricks and the under side of the roof skews 43 and also below the panel in the space 53.

In order to normally lock said panel in its functional position, the lower ends of the I-beams 28 of its frame extend downwardly below the level of the bottom brick course and extend into apertures or recesses 44 in any available sill or wall element 45. The upper end portions of said panel I-beams may be supported and secured in operative position in any suitable manner, but for purposes of illustration their rear flanges are shown as being cut away at 46 to permit of their being engaged and supported by restraining hooks 47 of brackets 48, that are welded to the front face of the skewback channel 49, which serves with an oppositely positioned channel to restrain and support the skews 43 and thereby the arch 10. By properly designing said brackets 48 or other form of panel locking means, the panel may be removed from position and returned thereto by the peel mechanism hereinbefore described.

When adapting the invention to either the sprung or suspended arch type of roofs, and particularly when the sprung type is present, the frontal skewback channel 49 is stiffened by an I-beam 50 or other structural member, preferably water-cooled which is supported by spaced, vertically positioned I-beams or the like 51 secured as by welding to the under side of a relatively large I-beam 52, that depends from and is supported by the under side of the spaced I-beams or channels 20 of the superstructure hereinbefore described, so that the roof is adequately restrained against transverse horizontal shifting and spreading while being fixedly supported in its intended position and relationship to the other parts of the furnace. The structures described above are intended for use in all types of furnaces which normally comprise fixed integral piers with charging doors adjacent such piers. The illustrations shown above represent the usual type of open hearth steel melting furnace but the invention is equally applicable to other high temperature furnaces, as for example, copper melting furnaces, and I therefore claim all such uses insofar as they fall within the reasonable spirit and scope of my invention.

Having thus described my invention, what I claim and desire to protect by Letters Patent of the United States is:

1. An open hearth furnace, comprising a wall provided with an opening, a self-contained door-separating panel demountably positioned in said opening and comprising the combination of spaced metallic elements, means to cross-brace said elements to insure their rigidity, horizontally extending brackets secured to said elements, refractory bricks demountably carried by said brackets, a peel-engageable lifting connection secured to the outer face of said panel for lifting said panel into and substantially horizontally free from said opening.

2. An open hearth furnace, comprising a wall provided with an opening, a self-contained door-separating panel comprising the combination of spaced metallic elements, means to cross-brace said elements to insure their rigidity, horizontally extending brackets secured to said elements, refractory bricks demountably carried by said brackets, a peel-engageable lifting connection secured to the outer face of said panel, and means carried by the upper and lower portions of said panel and engageable with the periphery of said opening to normally secure said panel in fixed position therein.

3. In an open hearth furnace, a self-contained door-separating panel comprising the combination of a metallic frame, horizontally extending brackets carried by said frame, hangers detachably mounted upon said brackets, refractory bricks carried by said hangers and covering the inner face of said frame, peel-engageable means secured to the outer face of said frame to permit lifting and setting said panel substantially horizontally in operative position in alignment with, as a unitary part of and within the plane of the outer surface of the front wall of the furnace while in heat, and means carried by the upper and lower edges of said panel and engageable with the periphery of said opening, to normally secure said panel in fixed position therein.

4. In an open hearth furnace, a front wall provided with an opening, a self-contained door-separating panel comprising the combination of a metallic frame, horizontally extending brackets carried by said frame, hangers detachably mounted upon said brackets, refractory bricks carried by said hangers and covering the inner face of said frame, peel-engageable means secured to the outer face of said frame to permit lifting and setting said panel substantially horizontally in operative position in said opening and in alignment with and as a unitary part of the front wall of the furnace, means to normally secure said panel in fixed operative position inside of the plane of the outer surface of said wall, and doors operable independently of said panel outside of the plane of said wall to close the subdivided openings upon the opposite sides of said panel.

5. An open hearth furnace, comprising the combination of a wall having a horizontally elongated opening, a pair of spaced charging doors partially closing said opening, with a door-separating panel positioned in said opening between the doors, said panel comprising the combination of a rigid framework, protective refractory material carried by the inner face of said framework, said refractory material being disposed wholly inside of the plane of the interior surfaces of said doors, and a peel-engageable socket member carried by the opposite face of said framework, to permit said panel to be moved into and out of operative position while in parallelism with the plane of said doors, by and upon being operatively engaged by the peel of a loading mechanism.

6. The combination of an open hearth furnace, having a horizontally elongated opening in its forward wall, a pair of doors spanning spaced portions of said opening and positioned outside of the plane of the outer surface of said wall, a unit panel spanning that portion of said opening between said doors and wholly inside of the common plane of the interior surfaces of said doors, said panel being removable after said doors have been removed, and means carried exteriorly by said panel and engageable by an extraneous peel for removing said panel in a direction perpendicular to its own plane.

7. An open hearth furnace, having a horizontally elongated opening, comprising a plurality of spaced doors positioned with their interior surfaces in such a given upright plane as to partially close said opening, a door-separating panel so disposed with respect to said doors as to close the rest of the opening, said panel comprising a metallic frame, brackets carried by said frame, refractory bricks carried by said brackets, said refractory bricks being disposed wholly inside the plane of the interior surfaces of said doors, and peel-engageable means carried by said frame for removing said panel horizontally outwardly of said opening in a direction perpendicular to the plane of said panel.

8. An open hearth furnace having a horizontally elongated opening comprising a plurality of spaced doors positioned with their interior surfaces in such a given upright plane as to together partially close said opening, a door-separating panel so disposed with respect to said doors as to close the rest of the opening, said panel comprising a rigid metallic frame, peel-engageable means carried by said frame, brackets carried by said frame, refractory bricks demountably carried by said brackets, said refractory bricks being disposed wholly inside of the plane of the interior surfaces of said doors, the lower wall of said opening being provided with an inwardly facing shoulder and an extension of said frame cooperating with said shoulder to prevent shifting of said panel outwardly until said frame is slightly lifted within said opening by an extraneous peel, after which said panel can be withdrawn directly horizontally outwardly in a direction perpendicular to its own plane.

RUSSELL PEARCE HEUER.

References Cited in the file of this patent

UNITED STATES PATENTS

| Number | Name | Date |
|---|---|---|
| 1,353,830 | Griggs | Sept. 28, 1920 |
| 1,415,630 | Griggs | May 9, 1922 |
| 1,611,819 | Davison | Dec. 21, 1926 |
| 1,864,333 | Aldrich | June 21, 1932 |
| 1,868,352 | Foltz | July 19, 1932 |
| 2,119,426 | Douglas et al. | May 31, 1938 |
| 2,219,363 | Hoak | Oct. 29, 1940 |
| 2,294,788 | Longenecker | Sept. 1, 1942 |
| 2,389,622 | Hensel | Nov. 27, 1945 |
| 2,402,152 | Drzewiecki | June 18, 1946 |